United States Patent
Yang

(10) Patent No.: US 11,830,483 B2
(45) Date of Patent: Nov. 28, 2023

(54) METHOD FOR PROCESSING MAN-MACHINE DIALOGUES

(71) Applicant: AI SPEECH CO., LTD., Suzhou (CN)

(72) Inventor: Xinwei Yang, Suzhou (CN)

(73) Assignee: AI SPEECH CO., LTD., Jiangsu (CN)

( * ) Notice: Subject to any disclaimer, the term of this patent is extended or adjusted under 35 U.S.C. 154(b) by 0 days.

(21) Appl. No.: 17/768,666

(22) PCT Filed: Nov. 25, 2019

(86) PCT No.: PCT/CN2019/120612
§ 371 (c)(1),
(2) Date: Apr. 13, 2022

(87) PCT Pub. No.: WO2021/072914
PCT Pub. Date: Apr. 22, 2021

(65) Prior Publication Data
US 2023/0162730 A1 May 25, 2023

(30) Foreign Application Priority Data
Oct. 14, 2019 (CN) .......................... 201910975502.9

(51) Int. Cl.
*G10L 15/22* (2006.01)
*G10L 15/18* (2013.01)
*G10L 15/08* (2006.01)

(52) U.S. Cl.
CPC .......... *G10L 15/1815* (2013.01); *G10L 15/22* (2013.01); *G10L 2015/088* (2013.01); *G10L 2015/223* (2013.01)

(58) Field of Classification Search
CPC ................. G10L 15/1815; G10L 15/22; G10L 2015/088; G10L 2015/223
See application file for complete search history.

(56) References Cited

U.S. PATENT DOCUMENTS

2009/0089065 A1   4/2009   Buck et al.
2014/0244273 A1*  8/2014   Laroche .................. G06F 3/167
                                                      704/275
(Continued)

FOREIGN PATENT DOCUMENTS

CN   101389059 A   9/2007
CN   102119538 A   7/2011
(Continued)

OTHER PUBLICATIONS

Foreign Communication from Related Application—Chinese Office Action with English Translation, CN Patent Application No. 201910975502.9 filed Oct. 14, 2019, 8 pages.

(Continued)

*Primary Examiner* — Abul K Azad
(74) *Attorney, Agent, or Firm* — Conley Rose, P.C.; Rodney B. Carroll

(57) ABSTRACT

The present disclosure discloses a method for processing man-machine dialogues, which includes: acquiring a first user voice message from a client; determining a dialogue intent corresponding to the first user voice message; determining a target duplex wake-up mode corresponding to the dialogue intent based on an intent wake-up mode table, wherein the intent-wake mode table includes duplex wake-up modes corresponding to a plurality of candidate dialogue intents respectively, and the duplex wake-up modes comprise a full-duplex wake-up mode and a half-duplex wake-up mode; and sending a wake-up mode instruction corresponding to the target duplex wake-up mode to the client, such that the client processes the first user voice message according to the target duplex wake-up mode. Using the method and apparatus for carrying out the method, the wake-up mode of the client may be switched dynamically.

13 Claims, 4 Drawing Sheets

(56) References Cited

U.S. PATENT DOCUMENTS

| | | | |
|---|---|---|---|
| 2014/0309996 A1 | 10/2014 | Zhang | |
| 2016/0286599 A1 | 9/2016 | Weingertner et al. | |
| 2020/0380994 A1* | 12/2020 | Luo | G10L 17/00 |
| 2021/0084589 A1* | 3/2021 | Yu | H04W 52/0229 |

FOREIGN PATENT DOCUMENTS

| | | | |
|---|---|---|---|
| CN | 104679472 A | 6/2015 | |
| CN | 106658369 A | 5/2017 | |
| CN | 107274897 A | 10/2017 | |
| CN | 109657091 A | 4/2019 | |
| CN | 109739971 A | 5/2019 | |

OTHER PUBLICATIONS

Foreign Communication from Related Application—International Search Report and Written Opinion of the Internationa Searching Authority, International Patent Application No. PCT/CN2019/120612 dated Jul. 15, 2020, 7 pages.

Foreign Communication from Related Application—Japan Office Action with English Translation, JP Patent Application No. 2022-522284 dated Nov. 11, 2022, 18 pages.

Foreign Communication from Related Application—Supplementary European Search Report, European Patent Application No. EP19948949 dated Jul. 15, 2020, 9 pages.

\* cited by examiner

METHOD FOR PROCESSING MAN-MACHINE DIALOGUES

CROSS REFERENCE TO RELATED APPLICATIONS

This application is a filing under 35 U.S.C. 371 of International Application No. PCT/CN2019/120612 filed on Nov. 25, 2019, entitled "Method for Processing Man-Machine Dialogues," which claims priority to Chinese Patent Application No. 201910975502.9, filed Oct. 14, 2019, which applications are incorporated by reference herein in their entirety.

TECHNICAL FIELD

The present disclosure belongs to the field of Internet technologies, and in particular relates to a method for processing human-machine dialogue.

BACKGROUND

With the continuous development of Internet technologies, man-machine dialogue technology has developed rapidly. In the development of man-machine dialogue technology, a full-duplex man-machine dialogue technology which is free of wake-up has emerged. That is, a device can continuously conduct dialogue in such a manner that it can talk to others and meanwhile perform man-machine interaction without interfering with each other. With such a full-duplex wake-up-free capability, users do not need to conduct wake up operation repeatedly, allowing the users to enjoy a more natural and smooth voice interaction experience.

At present, the application program is generally fixedly set to be in a full-duplex wake-up-free mode or a half-duplex wake-up-free mode. However, during the actual operation of the application in the full-duplex wake-up-free mode, both full-duplex and half-duplex scenarios may be involved. For example, when a contact's name corresponds to a plurality of phone numbers, it is necessary to determine a user's real intent through interaction therewith, so as to make an operation that meets the user's expectations.

SUMMARY

Embodiments of the present disclosure provide a method and apparatus for processing man-machine dialogue which are intended to solve at least one of the above technical problems.

In a first aspect, an embodiment of the present disclosure provides a method applied to a server for processing man-machine dialogues, including: acquiring a first user voice message from a client; determining a dialogue intent corresponding to the first user voice message; determining a target duplex wake-up mode corresponding to the dialogue intent based on an intent wake-up mode table, wherein the intent wake-up mode table comprises duplex wake-up modes corresponding to a plurality of candidate dialogue intents respectively, and the duplex wake-up modes comprise a full-duplex wake-up mode and a half-duplex wake-up mode; and sending a wake-up mode instruction corresponding to the target duplex wake-up mode to the client, such that the client processes the user voice message according to the target duplex wake-up mode.

In a second aspect, an embodiment of the present disclosure provides a method applied to a client for processing man-machine dialogues, including: acquiring a first user voice message; sending the first user voice message to a server; receiving a wake-up mode instruction from the server in response to the first user voice message; and processing the user voice message according to a target one of the duplex wake-up mode indicated by the wake-up mode instruction, wherein duplex wake-up modes comprise a full-duplex wake-up mode and a half-duplex wake-up mode.

In a third aspect, an embodiment of the present disclosure provides an apparatus for processing man-machine dialogues, including: a voice message acquiring unit configured to acquire a first user voice message from a client; a user intent determining unit configured to determine a dialogue intent corresponding to the first user voice message; a target wake-up mode determining unit configured to determine a target duplex wake-up mode corresponding to the dialogue intent based on an intent wake-up mode table, wherein the intent wake-up mode table includes duplex wake-up modes corresponding to a plurality of candidate dialogue intents, including a full-duplex wake-up mode and a half-duplex wake-up mode; and a wake-up instruction sending unit configured to send a wake-up mode instruction corresponding to the target duplex wake-up mode to the client, such that the client can process the user voice message according to the target duplex wake-up mode.

In a fourth aspect, an embodiment of the present disclosure provides an electronic device, including: at least one processor, and a memory communicatively connected to the at least one processor, wherein the memory stores instructions executable by the at least one processor, and the instructions are executed by the at least one processor to perform the steps of the above method.

In a fifth aspect, an embodiment of the present disclosure provides a storage medium on which a computer program is stored, and the program, when being executed by a processor, performs the steps of the above method.

The beneficial effects of the embodiments of the present disclosure are that, after receiving a user voice, a server will determine a corresponding dialogue intent, and determine a corresponding target duplex wake-up mode by querying an intent wake-up mode table, such that a client can work in a duplex wake-up mode according with the dialogue intent, and duplex wake-up modes can be switched dynamically in a client.

BRIEF DESCRIPTION OF THE DRAWINGS

In order to more clearly explain the technical solutions of the embodiments of the present invention, drawings necessary in the description of the embodiments will be described below. Obviously, the drawings in the following description are some embodiments of the present invention. Those skilled in the art can obtain other drawings based on these drawings without inventive effort.

DETAILED DESCRIPTION

Figure 1:
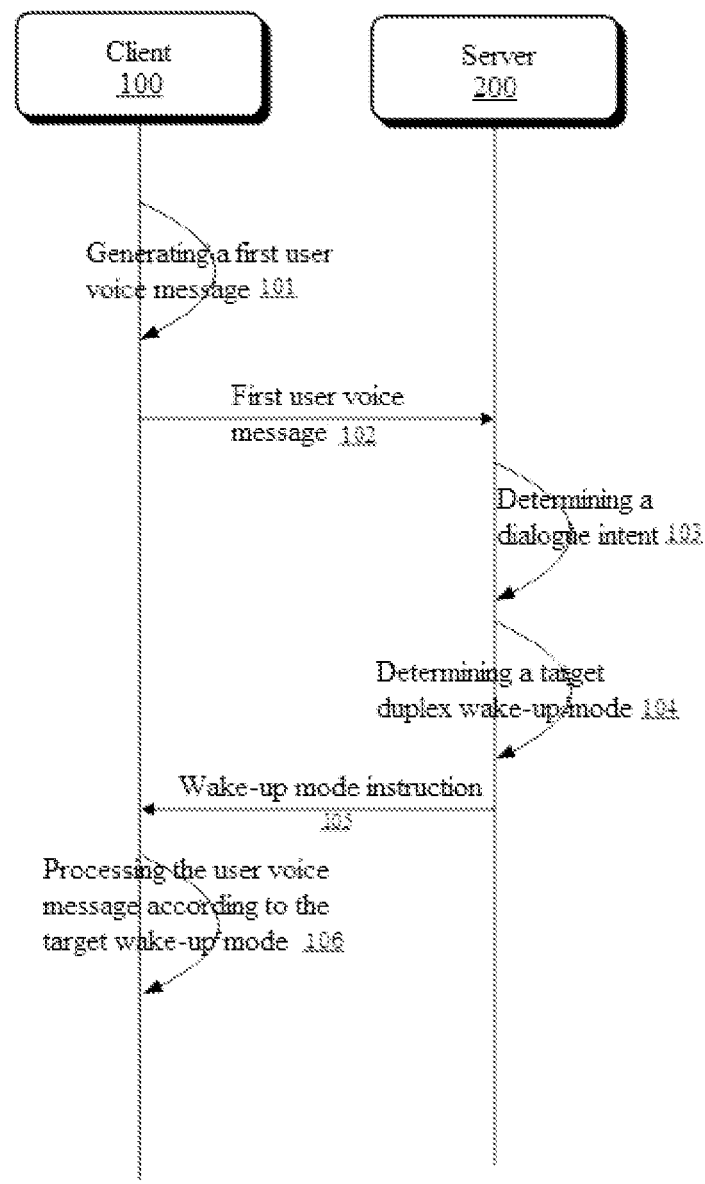
FIG. 1 shows a signal interaction flowchart of an example of a method for processing man-machine dialogues according to an embodiment of the present disclosure.

In order to make the objectives, technical solutions and advantages of the embodiments of the present disclosure clearer, the technical solutions in the embodiments of the present disclosure will be described clearly and completely below with reference to the accompanying drawings in the embodiments of the present disclosure. Obviously, the described are merely some but not all of the embodiments of the present invention. Based on the embodiments of the present invention, all other embodiments obtained by ordinary skilled in the art without inventive efforts shall fall within the scope of the present invention.

It should be noted that the embodiments in the present application and the features in these embodiments can be combined with each other when no conflict exists.

The present invention can be described in the general context of computer-executable instructions such as program modules executed by a computer. Generally, program modules include routines, programs, objects, elements, and data structures, etc. that perform specific tasks or implement specific abstract data types. The present invention can also be practiced in distributed computing environments in which tasks are performed by remote processing devices connected through a communication network. In a distributed computing environment, program modules may be located in local and remote computer storage media including storage devices.

In the present invention, "module", "means", "system", etc. refer to related entities applied to a computer, such as hardware, a combination of hardware and software, software or software in execution, etc. In detail, for example, an element may be, but is not limited to, a process running on a processor, a processor, an object, an executable element, an execution thread, a program, and/or a computer. Also, an application program or a script program running on the server or the server may be an element. One or more elements can be in the process and/or thread in execution, and the elements can be localized in one computer and/or distributed between two or more computers and can be executed by various computer-readable media. Elements can also be based on signals with one or more data packets, for example, a signal from data that interacts with another element in a local system, a distributed system, and/or interacts with other systems through signals on a network on the internet communicates through local and/or remote processes.

Finally, it should be noted that in this specification, terms such as first and second are used only to distinguish one entity or operation from another entity or operation, and do not necessarily require or imply there is any such actual relationship or order among these entities or operations. Moreover, terms such as "including" and "comprising" shall mean that not only those elements described, but also other elements not explicitly listed, or elements inherent to the described processes, methods, objects, or devices, are included. In the absence of specific restrictions, elements defined by the phrase "comprising . . . " do not mean excluding other identical elements from process, method, article or device involving these mentioned elements.

As shown in FIG. 1, a signal interaction flow of a method for processing man-machine dialogues according to an embodiment of the present disclosure involves data interaction between a client 100 and a server 200. The client 100 may be various types of terminals (such as a mobile phone, a smart speaker, a cleaning robot, etc., which is not limited in the present disclosure), and can collect user voices through a microphone, and conduct man-machine dialogue and communication with users. The server 200 may be a functional module in a voice service platform for processing interaction of man-machine dialogue, such as a server or a processor.

As shown in the interaction flow shown in FIG. 1, in step 101, the client 100 receives a user voice, and generates a first user voice message according to the user voice.

In step 102, the client 100 sends the first user voice message to the server 200.

In step 103, the server 200 determines a dialogue intent corresponding to the first user voice message. Here, after receiving the first user voice message, the server 200 obtains the corresponding voice semantics through NLP processing, and determines the corresponding dialogue intent.

It should be noted that the term "dialogue intent" may refer to that a user wishes to operate the client through a dialogue to perform corresponding actions, such as making a phone call, playing music, turning on the TV, or answering the user's question. Here, a full-duplex wake-up mode is preferable when the client processes user voice messages of some dialogue intents. For example, when the user intent is to request to play music, the client in a full-duplex wake-up mode can receive and process user voice messages when providing the music service, improving voice interaction experience. However, the client needs to be in a half-duplex wake-up mode when processing user operation information of some dialogue intents. That is, the client cannot receive and process user voice messages until the provision of the service is completed. For example, when the user intent is to make a phone call to persons in the address book with the same name, it is necessary to wait for the user to input further instructions to provide the calling service.

In step 104, the server 200 determines a target duplex wake-up mode corresponding to the dialogue intent based on an intent wake-up mode table. Here, the intent wake-up mode table includes duplex wake-up modes corresponding to a plurality of candidate dialogue intents, including a full-duplex wake-up mode and a half-duplex wake-up mode, and the intent-wake-up mode table may be set manually.

In step 105, the server 200 sends a wake-up mode instruction corresponding to the target duplex wake-up mode to the client 100.

In step 106, the client 100 may process the user voice message according to the target duplex wake-up mode. Thus, the client can process the user voice message according to the target wake-up mode corresponding to the intent of the user voice message, and adopt different duplex wake-up modes for different user voice messages, so as to adapt to diverse application scenarios.

Figure 2:
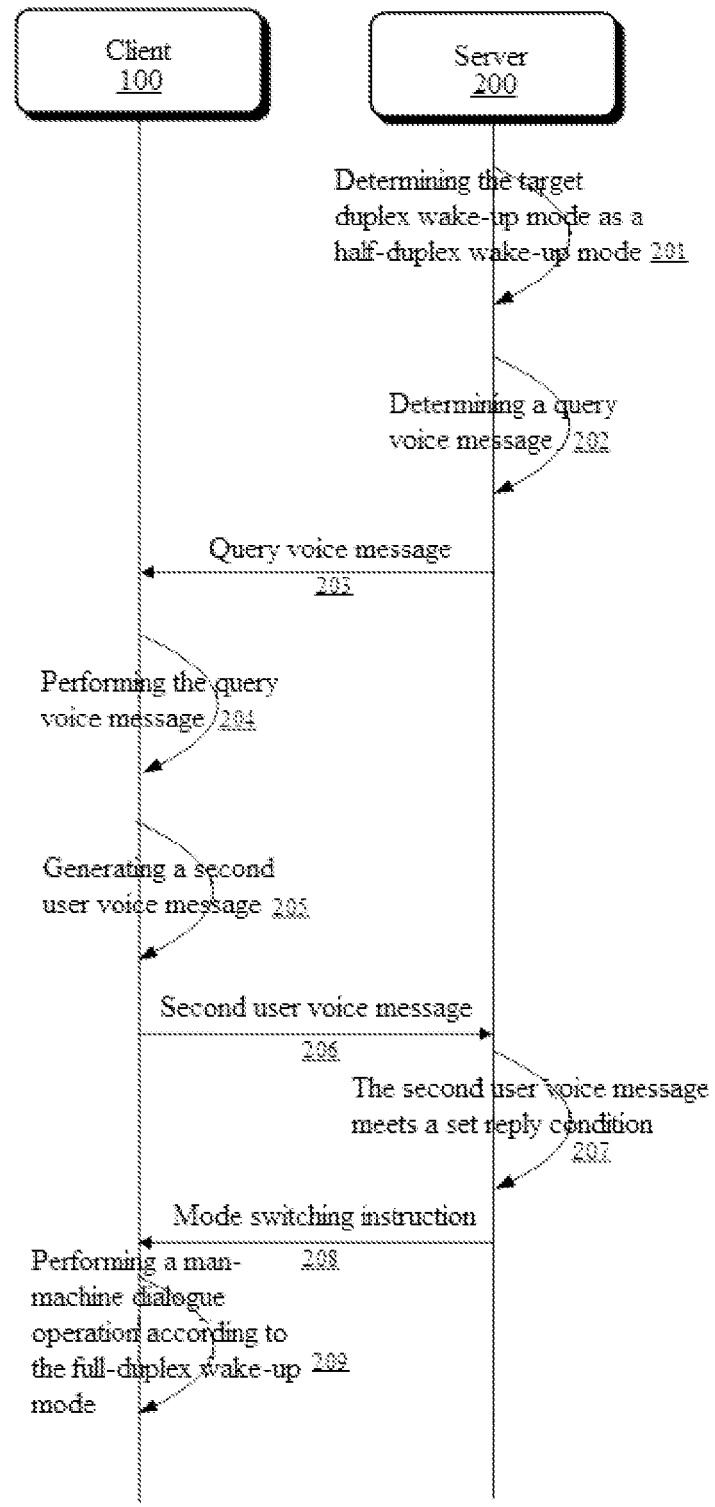
FIG. 2 shows a signal interaction flowchart of an example of a method for processing man-machine dialogues in a half-duplex wake-up mode according to an embodiment of the present disclosure.

As shown in FIG. 2, a flow of an example of a method for processing man-machine dialogues in a half-duplex wake-up mode according to an embodiment of the present disclosure is illustrated.

In step 201, the server 200 determines that the target duplex wake-up mode is a half-duplex wake-up mode. For example, the target wake-up mode may be determined to be a half-duplex wake-up mode according to the user intent. For the specific operation, reference may made to the description in FIG. 1, which will not be repeated here.

In step 202, the server 200 determines a query voice message for the dialogue intent. For example, for a dialogue intent such as "making a phone call to contacts having the same name in the address book", and the corresponding query voice in this case may be "Do you want to call the contact whose phone number is XX or the contact whose phone number is YY".

In step 203, the server 200 sends the query voice message to the client 100.

In step 204, the client 100 performs a man-machine dialogue operation in a half-duplex wake-up mode using the query voice message. For example, the client 100 broadcasts the received query voice message, and waits for user input to respond after the broadcast is completed.

In step 205, after receiving the query voice message, the user makes a voice reply, such that a second user voice message is generated at the client 100.

In step 206, the client 100 sends the second user voice message to the server 200.

In step 207, the server 200 determines whether the second user voice message meets a set reply condition. Here, the set reply condition may indicate whether the second user voice message satisfies a semantic filling requirement. Following the above example, if the semantics of the second user voice message does not include the phone number "XX" or "YY", it is determined that the second user voice message does not meet the semantic filling requirement. Additionally, if the semantics of the second user voice message includes a phone number "XX" or "YY", the client performs a corresponding action (e.g., making a phone call to a specific object).

In step 208, when the second user voice message meets a preset reply condition, the server 200 sends a mode switching instruction to the client 100. In some application scenarios, the client can enable the full-duplex wake-up mode by default, and then switches back to the full-duplex wake-up mode after the processing of the voice message corresponding to the half-duplex wake-up mode is completed.

In step 209, the client 100 performs a man-machine dialogue operation according to the full-duplex wake-up mode.

As described above, it may be recommended that the client terminal adopts the full-duplex wake-up mode by default, that is, the client 100 may acquire the first user voice message according to the full-duplex wake-up mode. After that, whether to switch to the half-duplex wake-up mode is determined according to the dialogue intent and the user input. In addition, in some application scenarios, the client 100 may also receive a full-duplex wake-up turn-off instruction from the server 200, so as to turn off the full-duplex wake-up mode and re-enter a wait-to-wake state.

Figure 3:
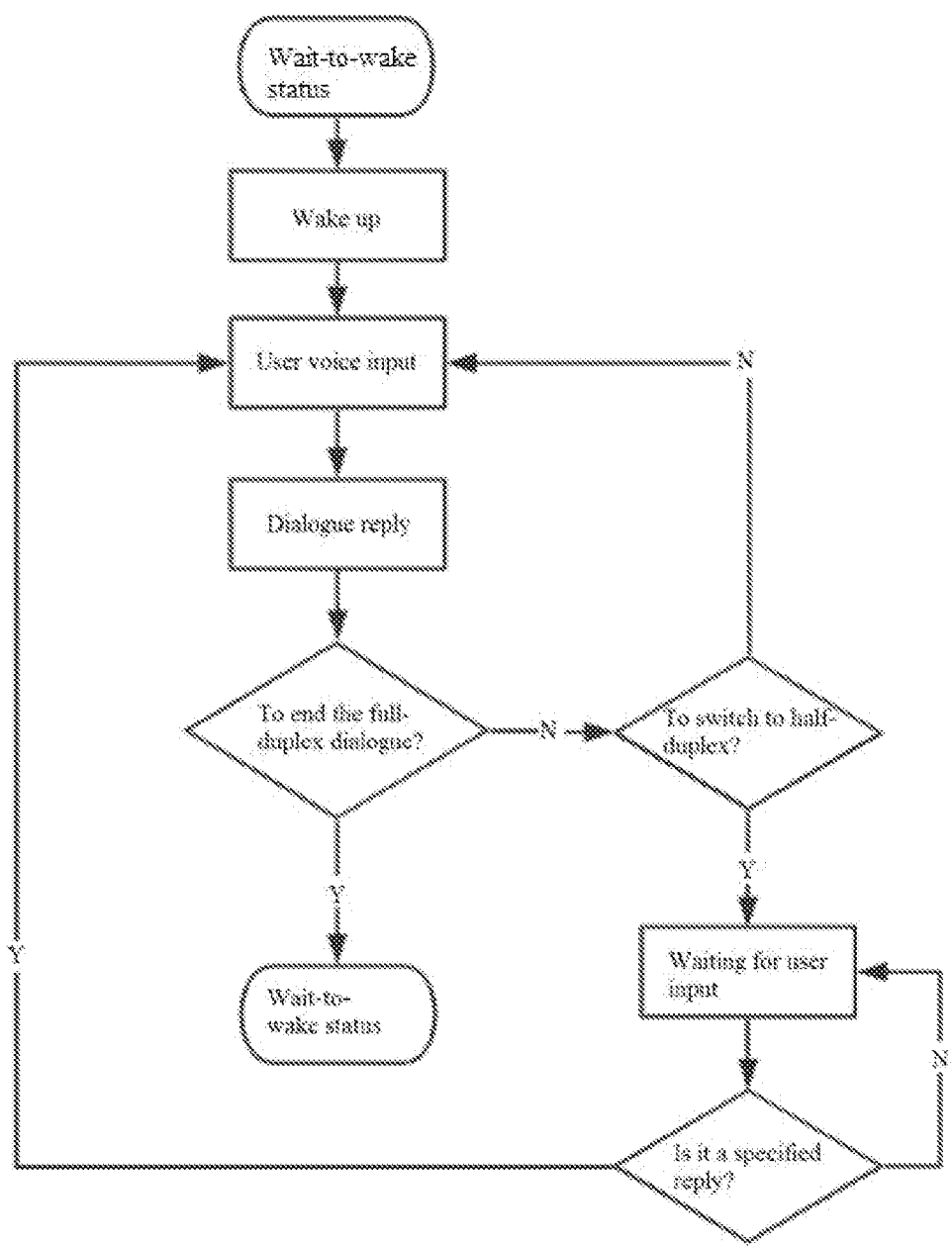
FIG. 3 shows a schematic flowchart of an example of a method for processing man-machine dialogues according to an embodiment of the present disclosure.

FIG. 3 shows a flow of a method for processing man-machine dialogues according to an embodiment of the present disclosure. In this embodiment, after a client is awoken, a full-duplex dialogue process is started. If a user voice message complies with a specified intent, the cloud (or server) sends an instruction to simulate half-duplex to the client. After that, the client switches to a half-duplex voice dialogue mode according to this instruction. In this mode, the dialogue will continue to wait for the user to input instructions until the next instruction on turning off half-duplex is sent.

Specifically, after the client is awoken by the user from the wait-to-wake state, a full-duplex dialogue mode is enabled. Then, the client receives a user voice message. In this case, the input may be normal user instruction audio or abnormal non-instruction audio. The user voice message needs to be uploaded to the server, and then the server returns a dialogue processing instruction according to the user voice message. After that, the client determines whether to end the full-duplex dialogue or switch to half-duplex according to the dialogue processing instruction. Here, after the client switches to the half-duplex mode, the client will wait for the user to input an expected instruction, or otherwise it will listen repeatedly until the expected instruction is received. For example, User input "make a phone call to Zhang San". Assuming that Zhang San has two numbers locally, the server will reply "which one?" In this case, the expected reply of the user is to select a certain one. If the user's input is not the expected one, the process will be repeated.

It should be noted that in some user scenarios, the cloud will issue an instruction to end full-duplex mode, and the client will also re-enter the wait-to-wake state.

In some embodiments, different duplex dialogue modes may be customized for different specified user scenarios, such as maintaining the full-duplex dialogue mode in a first user scenario and the half-duplex dialogue mode in a second user scenario. However, it may not be possible to dynamically switch between modes during one user dialogue, and it may also be difficult to handle new scenarios.

Through the embodiments of the present disclosure, the dialogue mode may be dynamically adjusted in a dialogue so as to adapt to a variety of user scenarios, and can avoid the problem of full-duplex experience caused by differences among devices and that among networks.

Figure 4:
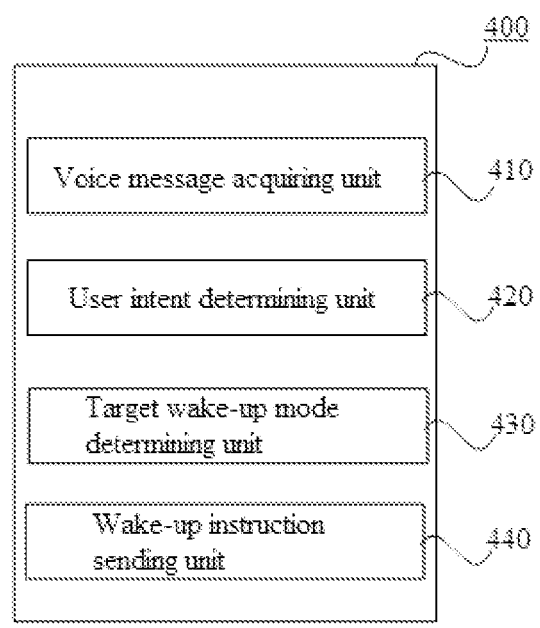
FIG. 4 shows a structural block diagram of an example of an apparatus for processing man-machine dialogues according to an embodiment of the present disclosure.

As shown in FIG. 4, an apparatus 400 for processing man-machine dialogues according to an embodiment of the present disclosure includes: a voice message acquiring unit 410 configured to acquire a first user voice message from a client; a user intent determining unit 420 configured to determine a dialogue intent corresponding to the first user voice message; a target wake-up mode determining unit 430 configured to determine a target duplex wake-up mode corresponding to the dialogue intent based on an intent wake-up mode table which includes duplex wake-up modes corresponding to a plurality of candidate dialogue intents such as full-duplex wake-up mode and half-duplex wake-up mode; and a wake-up instruction sending unit 440 configured to send a wake-up mode instruction corresponding to the target duplex wake-up mode to the client, such that the client can process the user voice message according to the target duplex wake-up mode.

The apparatus according to the above embodiment of the present disclosure may be applied to execute the corresponding method embodiment of the present disclosure, and correspondingly achieve the technical effects achieved by the above method embodiment of the present disclosure, which will not be repeated.

In the embodiments of the present disclosure, relevant functional modules may be implemented by a hardware processor.

On the other hand, an embodiment of the present disclosure provides a storage medium on which a computer program is stored, and the program is executed by a processor to execute the steps of the above method for processing man-machine dialogues.

The above product can execute the method according to the embodiments of the present disclosure, and has corresponding functional modules to execute the method and beneficial effects. For technical details not described in detail in this embodiment, reference may be made to the method according to the embodiments of the present disclosure.

Exemplarily, the present disclosure also provides a server, including at least one processor, and a memory communicatively connected to the at least one processor, wherein the memory stores instructions executable by the at least one processor, and the instructions are executed by the at least one processor to:

acquire a first user voice message from a client;

determine a dialogue intent corresponding to the first user voice message;

determine a target duplex wake-up mode corresponding to the dialogue intent based on an intent wake-up mode table, wherein the intent-wake mode table comprises duplex wake-up modes corresponding to a plurality of candidate dialogue intents respectively, and the duplex wake-up modes comprise full-duplex wake-up mode and half-duplex wake-up mode; and send a wake-up mode instruction corresponding to the target duplex wake-up mode to the client, such that the client processes the user voice message according to the target duplex wake-up mode.

In some embodiments, the at least one processor of the server of the present disclosure is further configured to, after sending the wake-up mode instruction corresponding to the target duplex wake-up mode to the client, determine a query voice message for the dialogue intent when the target duplex wake-up mode is a half-duplex wake-up mode,; and send the query voice message to the client, such that the client performs a man-machine dialogue operation in a half-duplex wake-up mode using the query voice message.

In some embodiments, the at least one processor of the server of the present disclosure is further configured to, after sending the query voice message to the client, acquire a second user voice message for the query voice message from the client;

determine whether the second user voice message meets a set reply condition; and send a mode switching instruction to the client when the second user voice message meets the set reply condition, such that the client performs a man-machine dialogue operation in a full-duplex wake-up mode.

Exemplarily, the present disclosure further provides a client, including: at least one processor, and a memory communicatively connected to the at least one processor, wherein the memory stores instructions executable by the at least one processor, and the instructions are executed by the at least one processor to:

acquire a first user voice message;

send the first user voice message to a server;

receive a wake-up mode instruction from the server in response to the first user voice message; and process the user voice message according to a target duplex wake-up mode indicated by the wake-up mode instruction, wherein duplex wake-up modes comprise a full-duplex wake-up mode and a half-duplex wake-up mode.

In some embodiments, the step of acquiring the first user voice message includes acquiring the first user voice message according to a full-duplex wake-up mode.

In some embodiments, the step of processing the user voice message according to the target duplex wake-up mode indicated by the wake-up mode instruction comprises:

when the target duplex wake-up mode is a half-duplex wake-up mode, acquiring a query voice message from the server; and performing a man-machine dialogue operation according to the half-duplex wake-up mode based on the query voice message.

In some embodiments, the at least one processor of the client according to the application is further configured so that after performing the man-machine dialogue operation according to the half-duplex wake-up mode based on the query voice message, the following steps are performed:

acquiring a second user voice message in response to the query voice message;

sending the second voice message to the server; and upon receiving a mode switching instruction in response to the second voice message from the server, performing a man-machine dialogue operation according to a full-duplex wake-up mode.

The client in the embodiments of the present application exists in various forms, including but not limited to:

(1) Mobile communication device which features in its mobile communication function and the main goal thereof is to provide voice and data communication, such as smart phones (such as iPhone), multimedia phones, functional phones, and low-end phones;

(2) Ultra-mobile personal computer device which belongs to the category of personal computers and has computing and processing functions and generally mobile Internet access capability, such as PDA, MID and UMPC devices, e.g., iPad;

(3) Portable entertainment devices which can display and play multimedia content, such as audio and video players (such as iPod), handheld game consoles, e-books, and smart toys and portable car navigation devices; and (4) Other electronic devices with data interaction function.

The device embodiments described above are only exemplary. The units described as separate components may or may not be physically separated, and the components displayed as units may or may not be physical units, that is, may be located in one place, or it can be distributed to multiple network elements. Some or all of the modules may be selected according to actual needs to achieve the object of the solution of this embodiment.

Through the description of the above embodiments, those skilled in the art can clearly understand that each embodiment can be implemented by means of software plus a common hardware platform, and of course, it can also be implemented by hardware. Based on this understanding, the above technical solutions can essentially be embodied in the form of software products that contribute to related technologies, and the computer software products can be stored in computer-readable storage media, such as ROM/RAM, magnetic disks, CD-ROM, etc., including several instructions to enable a computer device (which may be a personal computer, server, or network device, etc.) to perform the method described in each embodiment or some parts of the embodiment.

Finally, it should be noted that the above embodiments are only used to illustrate the technical solutions of the present application, rather than limitation. Although the present application has been described in detail with reference to the foregoing embodiments, those skilled in the art should understand that the technical solutions described in the foregoing embodiments can be modified, or some of the technical features can be equivalently replaced without deviating from the spirit and scope of the technical solutions of the embodiments of the present application.

What is claimed is:

1. A method for processing man-machine dialogues, applied to a server, comprising:

acquiring a first user voice message from a client;

determining a dialogue intent corresponding to the first user voice message;

determining a target duplex wake-up mode corresponding to the dialogue intent based on an intent wake-up mode table, wherein the intent-wake mode table comprises duplex wake-up modes corresponding to a plurality of candidate dialogue intents respectively, and the duplex wake-up modes comprise a full-duplex wake-up mode and a half-duplex wake-up mode; and sending a wake-up mode instruction corresponding to the target duplex wake-up mode to the client, such that the client processes the user voice message according to the target duplex wake-up mode.

2. The method according to claim 1, wherein after sending the wake-up mode instruction corresponding to the target duplex wake-up mode to the client, the method further comprises:

when the target duplex wake-up mode is a half-duplex wake-up mode, determining a query voice message for the dialogue intent; and sending the query voice message to the client, such that the client performs a man-machine dialogue operation in a half-duplex wake-up mode using the query voice message.

3. The method according to claim 2, wherein after sending the query voice message to the client, the method further comprises:

acquiring a second user voice message for the query voice message from the client;

determining whether the second user voice message meets a set reply condition; and when the second user voice message meets the set reply condition, sending a mode switching instruction to the client, such that the client performs a man-machine dialogue operation in a full-duplex wake-up mode.

4. A server comprising at least one processor and a memory communicatively connected to the at least one processor, wherein the memory stores instructions executable by the at least one processor, and the instructions are executed by the at least one processor to perform steps of the method of claim 1.

5. The server according to claim 4, wherein the at least one processor is further configured to: after sending the wake-up mode instruction corresponding to the target duplex wake-up mode to the client, when the target duplex wake-up mode is a half-duplex wake-up mode, determine a query voice message for the dialogue intent; and send the query voice message to the client, such that the client performs a man-machine dialogue operation in a half-duplex wake-up mode using the query voice message.

6. A method for processing man-machine dialogues, applied to a client, comprising:

acquiring a first user voice message;

sending the first user voice message to a server;

receiving a wake-up mode instruction from the server in response to the first user voice message; and processing the user voice message according to a target one of duplex wake-up modes indicated by the wake-up mode instruction, wherein the duplex wake-up modes comprise full-duplex wake-up mode and half-duplex wake-up mode.

7. The method according to claim 6, wherein said acquiring the first user voice message comprises:

acquiring the first user voice message according to a full-duplex wake-up mode.

8. The method according to claim 7, wherein said processing the user voice message according to the target duplex wake-up mode indicated by the wake-up mode instruction comprises:

when the target duplex wake-up mode is a half-duplex wake-up mode, acquiring a query voice message from the server; and performing a man-machine dialogue operation according to the half-duplex wake-up mode based on the query voice message.

9. The method according to claim 8, wherein after performing the man-machine dialogue operation according to the half-duplex wake-up mode based on the query voice message, the method further comprises:

acquiring a second user voice message in response to the query voice message;

sending the second voice message to the server; and upon receiving a mode switching instruction in response to the second voice message from the server, performing a man-machine dialogue operation according to a full-duplex wake-up mode.

10. A client, comprising at least one processor and a memory communicatively coupled to the at least one processor, wherein the memory stores instructions executable by the at least one processor, and the instructions are executed by the at least one processor to perform steps of the method of claim 6.

11. The client according to claim 10, wherein the instructions are executed by the processor to acquire the first user voice message according to a full-duplex wake-up mode so as to acquire the first user voice message.

12. The client according to claim 11, wherein the instructions are executed by the processor to process the user voice message according to the target duplex wake-up mode indicated by the wake-up mode instruction by:

acquiring a query voice message from the server when the target duplex wake-up mode is a half-duplex wake-up mode; and performing a man-machine dialogue operation according to the half-duplex wake-up mode based on the query voice message.

13. The client according to claim 12, wherein the instructions are executed by the processor to, after performing the man-machine dialogue operation according to the half-duplex wake-up mode based on the query voice message, acquire a second user voice message in response to the query voice message;

send the second voice message to the server; and perform a man-machine dialogue operation according to a full-duplex wake-up mode upon receiving a mode switching instruction in response to the second voice message from the server.

* * * * *